United States Patent
Niu et al.

(10) Patent No.: US 10,231,232 B2
(45) Date of Patent: Mar. 12, 2019

(54) REMOTE RADIO UNIT AND BASEBAND UNIT FOR ASYMETRIC RADIO AREA NETWORK CHANNEL PROCESSING

(71) Applicant: Intel IP Corporation, Santa Clara, CA (US)

(72) Inventors: Huaning Niu, Milpitas, CA (US);
Apostolos Papathanassiou, San Jose, CA (US); Geng Wu, Plano, TX (US)

(73) Assignee: Intel IP Corporation, Santa Clara, CA (US)

(*) Notice: Subject to any disclaimer, the term of this patent is extended or adjusted under 35 U.S.C. 154(b) by 460 days.

(21) Appl. No.: 14/578,045

(22) Filed: Dec. 19, 2014

(65) Prior Publication Data

US 2016/0183248 A1     Jun. 23, 2016

(51) Int. Cl.
| | |
|---|---|
| H04W 72/00 | (2009.01) |
| H04W 72/04 | (2009.01) |
| H04B 7/0413 | (2017.01) |
| H04W 74/08 | (2009.01) |
| H04W 88/02 | (2009.01) |

(Continued)

(52) U.S. Cl.
CPC ...... *H04W 72/0446* (2013.01); *H04B 7/0413* (2013.01); *H04W 72/0406* (2013.01); *H04W 74/0833* (2013.01); *H04W 88/02* (2013.01); *H04W 88/085* (2013.01); *H04W 92/10* (2013.01)

(58) Field of Classification Search
CPC ........... H04W 72/0406; H04W 88/085; H04W 92/10; H04W 88/02; H04W 72/0446; H04W 74/0833; H04W 72/048; H04L 25/00; H04B 7/0413; H04B 1/38
See application file for complete search history.

(56) References Cited

U.S. PATENT DOCUMENTS

| | | | |
|---|---|---|---|
| 8,842,628 B2 * | 9/2014 | Gao | ...... H04W 72/04 370/329 |
| 9,066,252 B2 * | 6/2015 | Liu | ...... H04W 28/0289 |

(Continued)

FOREIGN PATENT DOCUMENTS

| | | |
|---|---|---|
| CN | 104205673 A | 12/2014 |
| CN | 107113146 A | 8/2017 |

(Continued)

OTHER PUBLICATIONS

"Commin Public Radio Interface (CPRI); Interface Specification V4.2", (Sep. 29, 2010), 113 pgs.

(Continued)

*Primary Examiner* — Lan-Huong Truong
(74) *Attorney, Agent, or Firm* — Schwegman Lundberg & Woessner, P.A.

(57) ABSTRACT

Embodiments describe example radio access networks where uplink and downlink communications operate asymmetrically. In one embodiment, an inverse fast Fourier transform and an add cyclic prefix operation is performed on a downlink communications by a baseband unit. In an uplink communication using the same baseband unit, a corresponding fast Fourier transform and a remove cyclic prefix operation are performed at a remote radio unit. This generates different levels of traffic on a physical communication link between the baseband unit and the remote radio unit for uplink and downlink communications with similar characteristics.

18 Claims, 6 Drawing Sheets

(51) Int. Cl.
*H04W 92/10* (2009.01)
*H04W 88/08* (2009.01)

(56) References Cited

U.S. PATENT DOCUMENTS

| | | | |
|---|---|---|---|
| 2011/0013714 A1* | 1/2011 | Tamaki | H04L 25/03828 375/285 |
| 2012/0250740 A1* | 10/2012 | Ling | H04W 88/085 375/219 |
| 2013/0100907 A1* | 4/2013 | Liu | H04L 5/0023 370/329 |
| 2013/0170574 A1* | 7/2013 | Fleming | H04B 7/024 375/267 |
| 2013/0272170 A1* | 10/2013 | Chatterjee | H04W 28/02 370/280 |
| 2014/0064187 A1* | 3/2014 | Yokoyama | H04W 24/02 370/328 |
| 2014/0226736 A1 | 8/2014 | Niu et al. | |
| 2014/0341139 A1* | 11/2014 | Hu | H04L 5/0044 370/329 |
| 2014/0349667 A1 | 11/2014 | Hahn et al. | |
| 2015/0124688 A1* | 5/2015 | Xu | H04B 7/0452 370/312 |
| 2015/0131565 A1* | 5/2015 | Nakashima | H04L 1/0026 370/329 |
| 2015/0365934 A1* | 12/2015 | Liu | H04L 5/0039 370/329 |
| 2016/0088581 A1* | 3/2016 | Lorenz | H04W 56/0065 455/456.1 |

FOREIGN PATENT DOCUMENTS

| | | | | |
|---|---|---|---|---|
| TW | 201628365 A | | 8/2016 | |
| WO | WO 2013048526 A1 * | | 4/2013 | H04L 27/2628 |
| WO | WO-2016099748 A1 | | 6/2016 | |

OTHER PUBLICATIONS

"International Application Serial No. PCT/US2015/061064, International Preliminary Report on Patentability dated Jun. 29, 2017", 13 pgs.

"International Application Serial No. PCT/US2015/061064, International Search Report dated Feb. 29, 2016", 7 pgs.

"International Application Serial No. PCT/US2015/061064, Written Opinion dated Feb. 29, 2016", 11 pgs.

"Taiwanese Application Serial No. 104138087, Office Action dated Dec. 27, 2016", (W/ Partial English Translation), 12 pgs.

"Taiwanese Application Serial No. 104138087, Response Filed Jun. 26, 2017 to Office Action dated Dec. 27, 2016", (W/ English Claims), 79 pgs.

* cited by examiner

REMOTE RADIO UNIT AND BASEBAND UNIT FOR ASYMETRIC RADIO AREA NETWORK CHANNEL PROCESSING

TECHNICAL FIELD

Embodiments pertain to systems, methods, and component devices associated with a radio area network (RAN) and one example embodiment in particular pertains to an asymmetric centralized, cooperative, or cloud radio access RAN (C-RAN) with uplink and downlink communication functions and components structured asymmetrically across the remote radio units (RRU) and baseband units (BBU) of the C-RAN.

BACKGROUND

Wireless mobile communication technology uses various standards and protocols to transmit data between a base transceiver station or evolved universal mobile telecommunications system terrestrial radio access node B (eNB) and a wireless mobile device or user equipment (UE.) In a centralized, cooperative, or cloud radio access network (C-RAN), the base transceiver station or eNB functionality can be subdivided between a baseband unit (BBU) processing pool and remote radio equipment (RRE), a remote radio unit (RRU) or a remote radio head (RRH.)

DETAILED DESCRIPTION

Figure 1A:
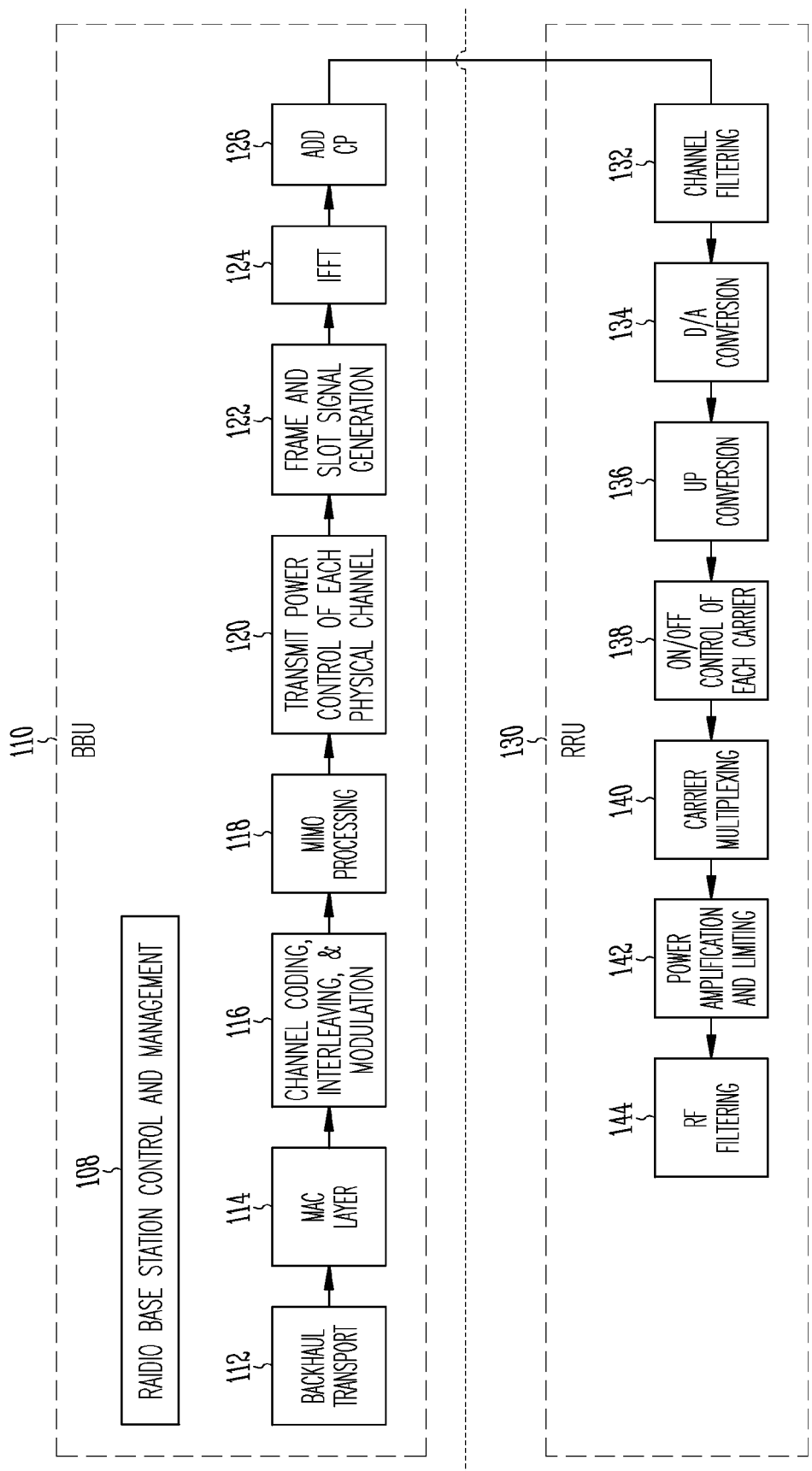
FIG. 1A illustrates a block diagram showing aspects of a BBU and an RRU of a RAN for a downlink transmission in accordance with an example embodiment.

Embodiments pertain to systems, methods, and component devices of a radio area network (RAN) and in particular, to an asymmetric RAN architecture and operation. The following description and the drawings illustrate specific embodiments to enable those skilled in the art to practice them. Other embodiments can incorporate structural, logical, electrical, process, and other changes. Portions and features of some embodiments can be included in, or substituted for, those of other embodiments. Embodiments set forth in the claims encompass all available equivalents of those claims.

In a C-RAN, the functionality of the eNB acting as a wireless intermediary between UE and a network can be split between a BBU and an RRU. For example, the BBU can provide the radio functions of the digital baseband domain, and the RRU can provide the analog radio frequency functions. One standard symmetrical architecture for C-RAN is defined by the Common Public Radio Interface (CPRI): Interface specification V4.2. Such a symmetrical architecture operates with the BBU and the RRU each performing similar corresponding operations for both uplink and downlink communications.

The BBU and the RRU in a C-RAN can communicate with each other via a physical transport network, such as an optical transport network. This creates benefits where a C-RAN system may have reduced costs and lower energy consumption than other systems, higher spectral efficiency, and support for multiple standards. Such a C-RAN may use modular system upgrades where BBU and RRU elements may be upgraded independently, providing system flexibility.

The physical transport network between the RRUs and BBUs carries a large amount of real time data, and can be a bottleneck on a C-RAN with heavy traffic. For example, the fiber of a fiber optic implementation of a physical transport network between the RRUs and BBUs may carry a large amount of baseband sampling data in real time.

In embodiments with such a physical transport network bottleneck, the architecture can be adjusted to reduce the data rate by reducing the digital processing at the BBU, which can reduce the baseband sampling data transmitted over the physical transport network. In certain embodiments, however, such a re-architecture provides more benefit for uplink communications through an eNB than for downlink communications through an eNB.

As referred to herein, uplink communications refer to communications received at an eNB from UE, and downlink communications refer to communications sent from the eNB to UE. Uplink communications in a C-RAN thus flow from an RRU to a BBU, and downlink communications from a BBU to an RRU. Embodiments described herein related to an asymmetric C-RAN where the split of eNB functionality between the BBU and the RRU is different for the uplink communications handled by the eNB than for the downlink communications handled by the same eNB.

For example, in one embodiment of an eNB for an asymmetric C-RAN, all the physical layer processing functions may take place at the RRU for downloads handled by the eNB, with cyclic prefix (CP) and inverse fast Fourier transform processing for the downlink handled by the BBU. This reduces the maximum fronthaul downlink rate to the eNB supported data rate. In a system with two transmit antennas, two receive antennas, and a 10 MHz system bandwidth, the fronthaul downlink rate would be around 100 M bits per second.

For the uplink in such an eNB of an asymmetric C-RAN, the CP and fast Fourier transform processing may be handled by the RRU rather than the BBU. This creates a different fronthaul rate for the uplink, where the fronthaul uplink rate is determined by frequency domain I/Q samples. In an embodiment wth 16 bit I/Q samples, the fronthaul uplink rate would be around 700 Mbps, thus resulting in an asymmetry between uplink and downlink fronthaul rates.

This asymmetry with a much higher upload rate compared to the downlink rate may be particularly useful for frequency division duplex systems. In particular, one drawback of the above described lower rate is the inability for a lower rate link to support joint transmission in certain embodiments. Frequency division duplex C-RAN systems which use beamforming may implement joint transmission, but due to feedback errors that require processor intensive compensation for downlink communication, the use of joint transmission may be inefficient for downlink communications. Such feedback errors do not present a problem in comparable time domain duplex systems. Thus, for the downlink of frequency division duplex systems, the drawback described above of the difficulty supporting joint transmission is largely negated since joint transmission would not be used in many implementations due to inefficiencies related to feedback errors. At the same time the performance and processing aggregation benefits described for pooled BBU elements of a system are still provided for the frequency division duplex systems with the rate asymmetry.

Additionally, because in certain embodiments, downlink signal processing may be simpler than uplink signal processing, pooling uplink receive processing at a BBU of the C-RAN allows the shared resources of the BBU to be utilized more efficiently than a system which performs this processing at individual RRUs. Further, this efficiency both with respect to BBU receive processing and uplink/downlink processing may provide improved component multipoint (CoMP) performance on the link where joint transmission/CoMP performance is enabled.

Figure 1B:
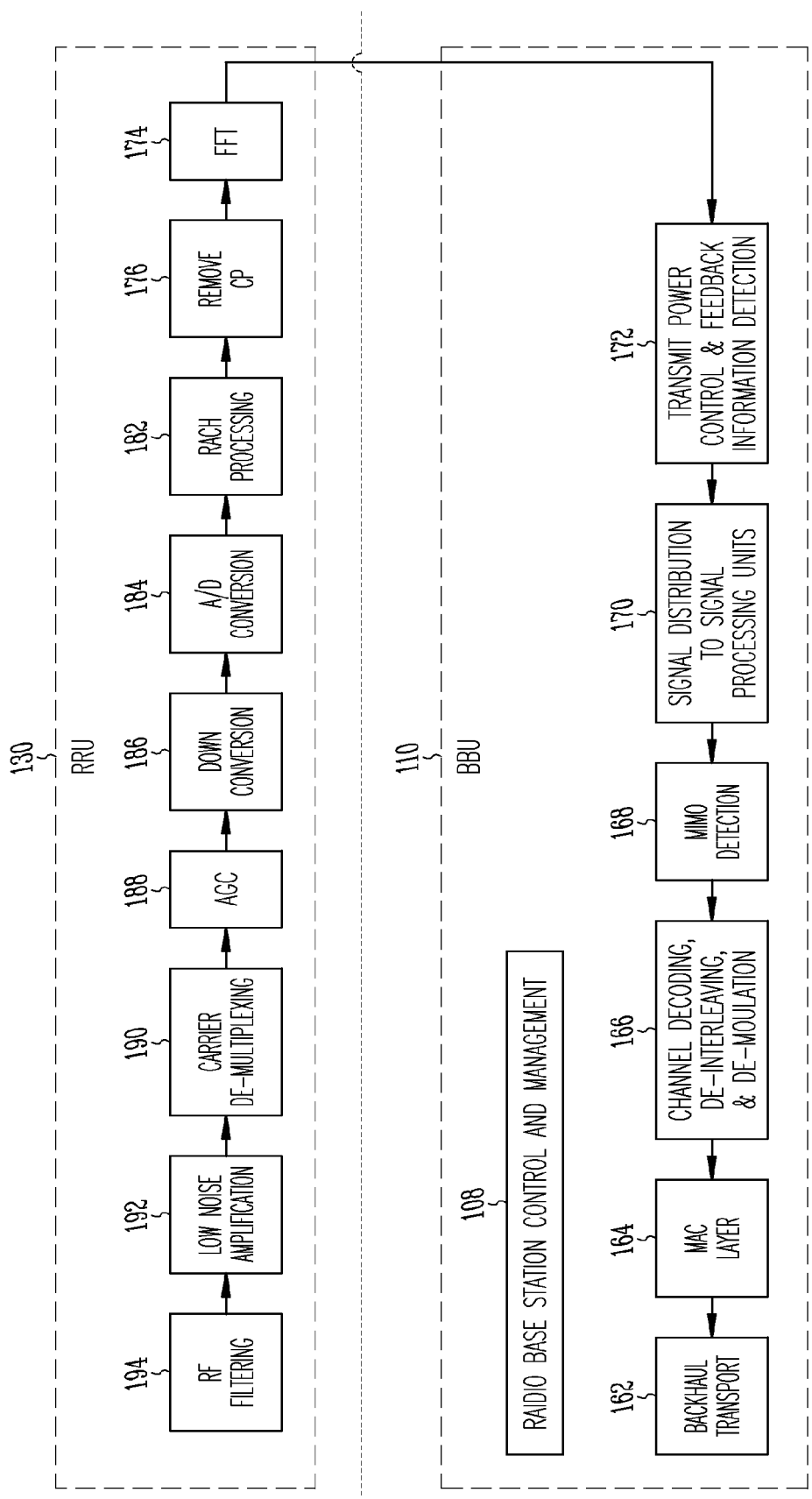
FIG. 1B illustrates a block diagram showing aspects of a BBU and an RRU of a RAN for an uplink transmission in accordance with an example embodiment.

FIGS. 1A and 1B illustrate block diagrams of a BBU 110 and an RRU 130 which may be components of an asymmetric C-RAN in accordance with an example embodiment. Details of how such components may fit within a C-RAN are described below with respect to FIG. 2. FIG. 1A illustrates downlink circuitry modules for BBU 110 and RRU 130, and FIG. 1B illustrates uplink circuitry modules for the same BBU 110 and an RRU 130. The asymmetry between the uplink systems of FIG. 1B and the downlink systems of FIG. 1A may be seen in the position of Fourier transform elements with inverse fast Fourier transform (IFFT) 124 in BBU 110 for the downlink process and corresponding fast Fourier transform (FFT) 174 in RRU 130 for the uplink process. The asymmetry may also be seen in CP processing elements and CP processing circuitry with add CP 126 processing circuitry within BBU 110 and the position of corresponding remove CP 176 processing circuitry within RRU 130.

The RRU 130 can be configured to communicate with the BBU 110 via a physical communication link, such as a fiber optic cable in an optical transport network, using a general interface (or shared interface) between the RRU 130 and BBU 110, such as the CPRI standard interface. While the CPRI standard defines a symmetric architecture, interfaces of the standard may be configured for an asymmetric system to provide an interface from add CP 126 of BBU 110 to channel filtering 132 of RRU 130 in the downlink systems and a different interface from FFT 174 of RRU 130 to transmit power control and feedback information detection 172 of BBU 110 in the uplink systems.

The RRU 130 can be configured to communicate with UE via an air interface using a wireless standard, such as 3GPP LTE. Other embodiments may use other wireless standards such as WiMAX. The BBU 110 is configured to communicate via a network through backhaul transport 162. A wireless communication system can be subdivided into various sections referred to as layers. In the LTE system, communication layers can include the physical (PHY), media access control (MAC), radio link control (RLC), packet data convergence protocol (PDCP), and radio resource control (RRC) layers. The physical layer can include the basic hardware transmission components of a wireless communication system, as illustrated in FIG. 1A for a downlink channel processing and 1B for an uplink channel processing.

In downlink channel processing, an eNB can include media access control (MAC) and physical (PHY) layer processing elements, such as a MAC layer processor, a channel coder, a channel interleaver, a channel modulator, a multiple-input multiple-output (MIMO) processor, a transmit power controller, a frame and slot signal generator, an inverse fast Fourier transform (IFFT) modulator, a CP adder, a channel filter, a digital-to-analog converter (DAC), an up converter, a gain controller, a carrier multiplexer, a power amplifier and limiter a radio frequency (RF) filter, and one or more transmit antennas. As used herein, any description of an eNB such as the description above applies equally to base transceiver station embodiments.

The functionality of the eNB can be split between a BBU 110 and RRU 130, as illustrated in FIGS. 1A and 1B. BBU 110 can provide the radio functions of the digital baseband domain, and the RRU can provide the analog radio frequency functions. Compared to the CPRI standard mentioned above, BBU 110 can provide similar functionality to a radio element controller (REC) and the RRU can provide similar functionality to a radio element (RE) or remote radio element (RRE). The BBU 110 can provide radio base station control and management 108. The BBU can also include backhaul transport 112 processing; MAC layer 114 processing; channel coding, interleaving, and modulation 116; MIMO processing 118; transmit power control of each physical channel 120; frame and slot signal generation 122; IFFT 124 modulation; and adding CP 126. The RRU can include channel filtering 132, digital-to-analog (D/A) conversion 134, up conversion 136, on/off control of each carrier 138, carrier multiplexing 140, power amplification and limiting 142, and RF filtering 144. In various alternative embodiments, these elements of BBU 110 may be structured together or separately in any possible way as part of different system hardware components.

In uplink channel processing illustrated by FIG. 1B, the eNB can include similar or identical elements corresponding to the downlink channel processing elements of FIG. 1A. The downlink processing elements of an eNB can thus include MAC and PHY layer processing elements, such as one or more receive antennas, an RF filter, a low noise amplifier, a carrier de-multiplexer, an automatic gain controller, a down converter, an analog-to-digital converter (ADC), a CP remover, a fast Fourier transform (FFT) demodulator, a transmit power control and feedback information detector, a signal distribution and signal processor, a MIMO detector, a channel de-modulator, a channel de-interleaver, a channel decoder, and a MAC layer processor. Just and described above for the downlink, the uplink functionality of the eNB can be split between the BBU 110 and the RRU 130.

In the embodiment of FIG. 1B, RRU 130 includes RF filtering 194, low noise amplification 192, carrier de-multiplexing 190, automatic gain control (AGC) 188, down conversion 186, digital-to-analog (D/A) conversion 184, channel filtering 182, CP removal 176 circuitry, and FFT 174 demodulation. The BBU 110 includes transmit power control and feedback information detection 172; signal distribution to signal processing units 170; MIMO detection 168; channel decoding, de-interleaving, and de-modulation 166; MAC layer 164 processing; and backhaul transport 162 processing circuitry.

In such an embodiment of an RRU 130, a channel filtering 132 module functions for DL channel processing along with a digital-analog conversion module, a frequency conversion module, a gain, control module, a carrier multiplexing module, an amplification module, and a filtering module. The digital-analog conversion module can include a digital-to-analog converter (DAC) 134 for downlink channel processing or an analog-to-digital converter (ADC) 184 for uplink channel processing. The conversion module can include an up converter 136 for downlink channel processing or a down converter 186 for uplink channel processing. A random access channel (RACH) 182 processing module or circuitry may be used for uplink channel processing when the CP remover is located within the RRU. A physical random access channel (PRACH) or a random access channel (RACH) can be used for initial access by the UE to the RAN and when the UE losses its uplink synchronization. The gain control module can include an on/off controller for each carrier 138 for downlink channel processing or an automatic gain controller (AGC) 188 for uplink channel processing. The carrier multiplexing 140 module can include a carrier multiplexer for downlink channel processing or a carrier de-multiplexer 190 for uplink channel processing. The amplification module can include a power amplifier and limiter 142 for downlink channel processing or a low noise amplifier 192 for uplink channel processing. The filtering module can include a radio frequency filter 144 or 194.

As mentioned above, one way of reducing the amount of data transported between an RRU and a BBU is to perform Fourier transform processing at a different position. For an orthogonal frequency division multiplexing signal using the uplink and downlink processing described in FIGS. 1A and 1B, the Fourier transform processes transform the signal in a way that impacts the amount of data associated with the signal. For a downlink communication, IFFT 124 transforms the downlink communication from a frequency domain signal into a time domain signal for communication using an air interface. For an uplink communication, FFT 174 transforms the uplink communication that has been received from an air interface from a time domain signal into a frequency domain signal. Thus, the physical link between RRU 130 and BBU 110 as illustrated by FIG. 1A carries a downlink communication as a time domain signal, and the physical link as illustrated by FIG. 1B carries an uplink communication as a frequency domain signal. The asymmetry between a communication as represented by a time domain signal as compared to the communication as represented by the frequency domain signal may create a different load on the physical communication link between the BBU 110 and the RRU 130.

Further, another way of reducing the amount of data transported between an RRU and a BBU is by moving the location where a CP module functions from the BBU to the RRU. A CP is an extra amount of data that is added onto a signal. By removing the CP from a downlink communication at the RRU, the amount of data to be sent over a physical communication link is reduced. In certain embodiments, the data and overhead associated with the CP may be around 7% of the data associated with the downlink communication, and removing the CP from the downlink communication at the RRU may reduce downlink communication bandwidth consumption by a corresponding 7%. In other embodiments, depending on the system characteristics associated with the CP, different amounts of benefit may be seen.

As discussed in the initial example, cyclic prefix (CP) and inverse fast Fourier transform processing for the downlink handled by the BBU. This reduces the maximum fronthaul downlink rate to the eNB supported data rate. In a system with two transmit antennas, two receive antennas, and a 9-11 MHz system bandwidth, the fronthaul downlink rate would be around 90-110 M bits per second. For the uplink in such an eNB of an asymmetric C-RAN, the CP and fast Fourier transform processing may be handled by the RRU rather than the BBU. This creates a different fronthaul rate for the uplink, where the fronthaul uplink rate is determined by frequency domain I/Q samples. In an embodiment with 16 bit I/Q samples, the fronthaul uplink rate would be around 600-800 Mbps, thus resulting in an asymmetry between uplink and downlink fronthaul rates. In other embodiments or system designs with different numbers of antennas and a different system bandwidth, other fronthaul rates may result. The asymmetry in fronthaul rates comes from the architecture differences illustrated by FIGS. 1A and 1B, with remove CP 176 and FFT 174 circuitry within RRU 130 as part of the uplink functionality illustrated by FIG. 1B in order to reduce the data transported between RRU 130 and BBU 110. The corresponding circuitry for the downlink functionality of FIG. 1A of add CP 126 and IFFT 124 circuitry, however, remains in BBU 110 in order to take advantage of the shared resources of a centralized set of baseband units that may include BBU 110 in a baseband processing pool 210 as illustrated by FIG. 2.

Figure 2:
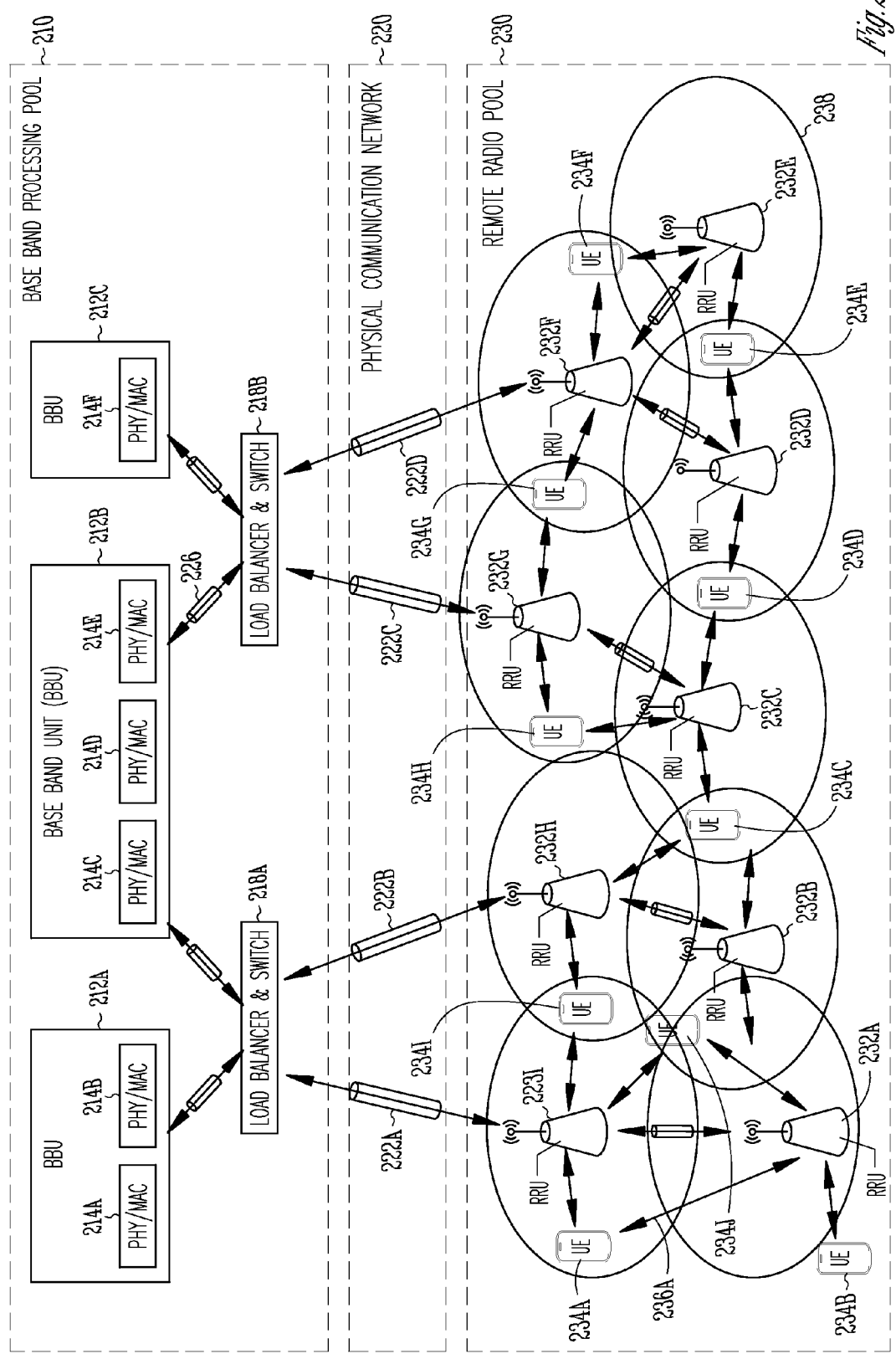
FIG. 2 illustrates a block diagram of a RAN in which asymmetric UL and DL may be implemented according to one example embodiment.

FIG. 2 then illustrates aspects of an example C-RAN 200 that may be used to implement asymmetric functionality between BBU and RRU elements as described above with respect to BBU 110 and RRU 130. C-RAN 200 can provide centralized processing, co-operative radio, and real-time cloud infrastructure RAN. Centralized signal processing can greatly reduce the number of site equipment rooms needed to cover the same area as a traditional RAN. Co-operative radio with distributed antenna equipped by a remote radio unit (RRU) can provide higher spectrum efficiency than the traditional RAN. A real-time cloud infrastructure based on an open platform and eNB virtualization can enable processing power aggregation and dynamic allocation, which can reduce the power consumption and increase infrastructure utilization rate. C-RAN 200 can provide reduced cost and lower energy consumption, higher spectral efficiency, support multiple standards and smooth evolution, and better internet services to end users.

In particular, one characteristic of a mobile network is that mobile devices frequently move from one place to another. The movement of mobile devices can have a time-geometry trend. During work hours, for example, a large number of mobile devices move from residential areas to central office areas and industrial areas for work. During evening hours or non-work hours, mobile devices move back to the residential areas (e.g., homes) or entertainment areas. Thus, the network load moves in the mobile network with a similar pattern. Each eNB's processing capability may be used by the active mobile devices within the eNB's cell range. When mobile devices move outside the eNB's cell range, the eNB can remain idle with a large portion of the eNB's processing power wasted. The C-RAN architecture can allow a portion of eNB processing located at a BBU to be utilized much more broadly by a remote pool of RRU than is possible in a RAN where BBU and RRU elements are tightly coupled.

C-RAN 200 of FIG. 2 includes a remote radio pool 230, a baseband processing pool 210, and physical communication network 220 that connects baseband processing pool 210 with remote radio pool 230. Remote radio pool 230 comprises a number of remote radio units (RRUs) 233A-I with antennas. Base band processing pool 210 includes base-band units (BBUs) 212A-C. The physical transport network implemented as physical communication network 220 includes physical communication links 222A-D. Physical communication network 220 connects at least one of the RRUs in the remote radio pool 230 to at least one of the BBUs in the baseband pool 210. In an embodiment where physical communication network 220 is an optical communication network, physical communication links 222A-D may each be optical communication links.

The baseband processing pool 210 can be centralized. Each BBU of baseband processing pool 210 can include a high-performance general purpose processor, a real-time virtualization processor, and/or a physical (PHY) layer processor and/or a MAC layer processor 214A-F. The BBUs can be coupled to a load balancer and switch 218A-B via electrical or optical cabling 226. In various embodiments, a physical communication network 220 can be a low-latency transport network, a bandwidth-efficient network, and/or an optical transport network using optical fiber or optical cabling. In another example, the physical communication network 220 can be a high speed electrical transport network. The physical communication network 220 can provide a physical communication link between the BBUs 212A-C and the RRUs 232A-I. The physical communication network 220 can include an optical fiber link, a wired electrical link, or both. The physical communication link can use aspects the CPRI standard, or may use a custom interface. In the CPRI standard, the BBU can be referred to as a radio element controller (REC). The RRU can be referred to as a remote radio head (RRH), a remote radio equipment (RRE), or a radio equipment (RE). Each RRU of the remote radio pool 230 can be separated from a BBU of the baseband processing pool 210 by a selected distance. Each RRU can include a sector, cell, or coverage area 238 for a mobile device, such as a user equipment (UE) 234A-J, where the mobile device may be located within multiple sectors, cells, or coverage areas. The distributed RRUs that make up remote radio pool 230 of the C-RAN 200 can provide a RAN with high capacity and a wide coverage area.

RRUs 232A-I can be smaller, easier to install, easier to maintain, and consume less power than the BBUs 212A-C. The baseband processing pool 210 can aggregate the processing power of the BBU through real-time virtualization technology and provide the signal processing capacity to the virtual eNBs or RRUs in the pool. The physical communication network 220 can distribute the processed signals to the RRUs in the remote radio pool 230. The centralized baseband processing pool 210 can reduce the number of eNB rooms used for BBUs and can make resource aggregation and large-scale cooperative radio transmission/reception possible. A eNB room can be an equipment room used to house BBUs of the baseband processing pool 210 and other eNB processing equipment.

A physical communication link can use the CPRI. A radio element controller (REC) can contain the radio functions of the digital baseband domain, and a radio element (RE) can contain the analog radio frequency functions. The functional split between both parts can be performed so that a generic interface based on In-Phase and Quadrature-Phase (IQ or I/Q) data can be defined. CPRI standard interface communication structures can be used to transmit IQ samples between the REC (or BBU) and the RE (or RRU). For WiMAX, the REC can provide access to network entities (e.g. other BSs or access services network gateway (ASN-GW)), and the RE can serve as the air interface to a subscriber station (SS) and/or a mobile subscriber station (MSS). For evolved universal terrestrial radio access (E-UTRA) network, UTRAN, or evolved UTRAN (eU-TRAN) used in 3GPP LTE, the REC can provide access to the evolved packet core (EPC) for the transport of user plane and control plane traffic via an Si interface, and the RE can serve as the air interface to the UE.

For an asymmetric C-RAN, the physical communication network 220 such as an optical transport network may use separate interface settings for uplink and downlink communications, which may be customized or standard based. In certain embodiments, a radio base station control and management system within baseband pool 210 may be used to manage the separate interface settings for the uplink and downlink communications. In certain embodiments, this may be radio base station control and management 108 of a BBU 110 that is part of baseband pool 210.

The physical communication network 220 can act as a bottleneck on a C-RAN with heavy mobile internet traffic. The fiber of the physical transport network between the RRUs and BBUs may carry a large amount of baseband sampling data in real time. For example, in a 20 megahertz (MHz) frequency-division duplexing (FDD) four antennas deployment, with 16 bit per I/Q sample respectively and 8 B/10 B line coding, the rate on a fiber (or fiber link rate) is $4 \times 16 \times 2 \times 10/8 \times 30.72$ M=4.915 Gigabits per sample (Gbps) (4 antennas×16 bit per I/Q sample×2 bits per I/Q data×10/8 bits for line coding×30.72 megabits (Mb) per sample for an LTE sampling rate). The fiber link rate (also referred to as the CPRI rate when CPRI standard interfaces are used) can be the data rate on a fiber or cable of the physical transport network. Support of more advanced feature such as carrier aggregation or more antennas (e.g., eight antennas) can dramatically increase the data rate on the physical transport network. The high data rates between the REC and the RE to carry the baseband sampling data in real time can reduce the cost effectiveness of the C-RAN architecture.

Three different approaches can be used to handle the high data rate of the physical transport network. In a first approach, data compression techniques such as reducing number of bits/sample or non-linear quantization can be used, which can reduce performance (using simple quantization) or increase complexity. Second, the fiber network can be upgraded to provide wavelength division multiplexing (WDM), which can increase the cost of the physical transport network and the C-RAN. Third, data transmitted over a physical transport network may be reduced by reducing the digital processing at the BBU and/or the amount of baseband sampling data transmitted over the physical transport network. Moving CP circuitry and/or FFT circuitry can reduce a fiber link rate with minimal performance complexity at the RRU.

Figure 3:
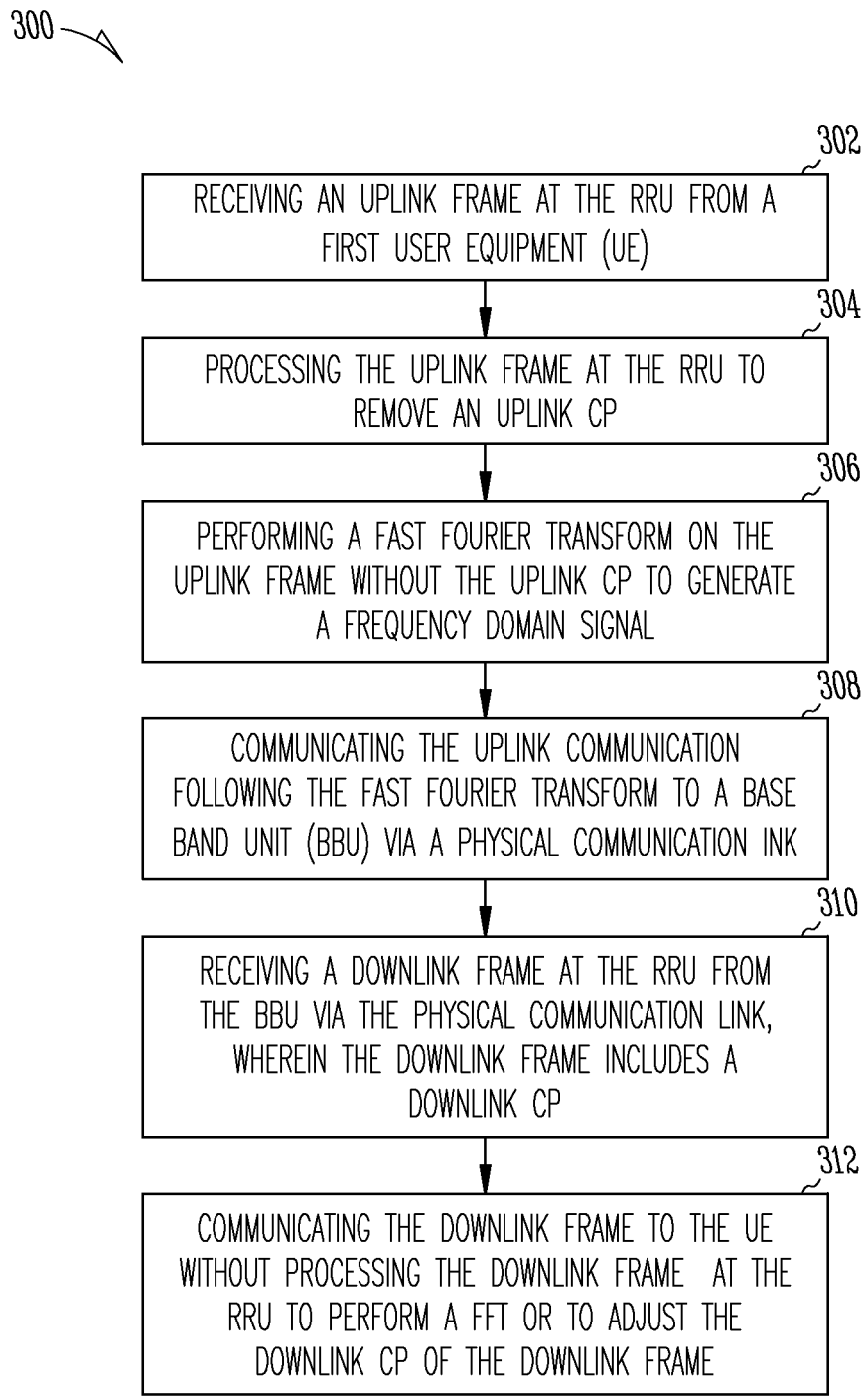
FIG. 3 shows a method for asymmetric UL and DL in a RAN according to one example embodiment.

FIG. 3 then describes one example embodiment of a method, shown as method 300, for channel processing on a RRU in a RAN. For illustrative purposes, method 300 is described with respect to the elements of BBU 110, RRU 130, and RAN 200 discussed above. In other embodiments, different methods of asymmetric communication using a RAN may be performed using other implementations of a RAN, an RRU, and a BBU.

Operation 302 involves receiving an uplink frame at the RRU 130 from a first user equipment (UE). A frame may be considered a unit of communication for any uplink or downlink communication described herein. As discussed above and in more detail below, such an uplink communication may use any wireless communication standard or wireless communication method. A UE involved with operation 302 may be similar to UE 234A-I, UE 400 described below with respect to FIG. 4, or any other such UE.

Operation 304 involves processing the uplink frame at the RRU 130 to remove an uplink CP. In various embodiment a CP, or cyclic prefix, represents a guard period at the start of a symbol which provides protection against multi-math delay spread. Such a CP may be generated by copying the end of a symbol that is part of a communication to a beginning prefix in front of that symbol. Removal of a first CP from the uplink communication thus involves removal of the beginning prefix in front of the symbol that matches an end portion of the symbol that makes up at least a portion of the uplink communication. The uplink communication comprises at least a single symbol with a cyclic prefix, but may comprise any number of symbols, with at least a portion of the symbols having a CP when received by RRU 130. Operation 304 may be performed by remove CP 176 implemented as CP remover circuitry in CP processing circuitry of RRU 130.

Operation 306 involves performing a fast Fourier transform on the uplink frame without the uplink CP to generate a frequency domain signal. Any known circuitry for performing a fast Fourier transform may be used in conjunction with operation 306, such that the processing speed associated with the FFT is sufficient for the communication speed of the associated link.

Operation 308 involves communicating the uplink communication following the fast Fourier Transform to BBU 110 via a physical communication network 220. As discussed above, physical communication network 220 may be an optical communication link with an interface defined by the CPRI standard. In various additional embodiments where multiple symbols are processed as part of one or more uplink communications, different uplink communications may be sent to different BBUs that are part of a baseband processing pool 210 comprising BBU 110, and a load balancer and switch 218 may assist with selecting different BBUs including BBU 110 from among BBUs of baseband processing pool 210.

Operation 310 involves receiving a downlink frame at the RRU 130 from the BBU 110 via the physical communication network 220, wherein the downlink frame includes a downlink CP. The downlink frame, similar to the uplink frame discussed above, is made up of one or more symbols, with at least a portion of the symbols having a CP in front. Operation 312 involves communicating the downlink communication to the UE without processing the downlink frame at the RRU to perform a FFT or to adjust the downlink CP of the downlink frame. As such, in certain embodiments, the asymmetry of a system performing method 300 may be characterized as CP and FFT/IFFT processing being separately performed by RRU 130 for uplink communications and BBU 110 for downlink communications. This may be contrasted with symmetrical methods where the CP and FFT/IFFT processing is performed either by the RRU for both uplink and downlink communications, or is performed by the BBU for both uplink and downlink communications.

Various additional methods may operate in conjunction with method 300 described above. Such methods may each include the operation of receiving a signal at the RRU from a baseband unit (BBU) via a physical communication link, wherein the BBU is configured for media access control (MAC) layer processing, and the RRU is configured to communicate with a wireless mobile device via an air interface.

Such methods may operate with an RRU comprising radio frequency (RF) filtering circuitry, with different downlink RF filtering 144 and uplink RF filtering 194 circuitry or configurations used for frequency division duplex communications where the uplink communications use a different frequency than the downlink communications. Such methods may additionally operate with RRU 130 comprising a plurality of transmit antennas and a plurality of receive antennas, with the RRU 130 configures such that the uplink communication comprises a joint transmission communication. Such methods may additionally operate wherein the downlink communication is not a joint transmission communication, or where the RRU 130 is not configured or capable of sending a downlink communication as a joint transmission communication. Similar methods may operate with an RRU 130 further comprising a plurality of transmit antennas and a plurality of receive antennas, wherein the RRU is further configured such that the uplink communication is part of an uplink joint transmission. Still further such methods may operate where the RRU 130 is further configured such that the downlink communication is not part of a downlink joint transmission.

One implementation of such an RRU may operate with a system bandwidth of between 9-11 MHz, a downlink rate from the BBU of between 90 Mbps and 110 Mbps, a frequency domain I/Q sampling rate of 16 bits, and an uplink rate to the BBU of between 600 Mbps and 800 Mbps. Additional alternative embodiments may operate with different settings.

An additional example of RRU 130 may operate with a random access channel (RACH) processing module 182 for uplink channel processing.

In addition to the method 300 performed by an RRU 130, a corresponding method may be performed by BBU 110. In such a method, BBU 110 enables communication between devices on a network and a UE via RRU 130. Downlink communications have a CP added by add CP 126 module of BBU 110 prior to BBU 110 sending the downlink communications to RRU 130. Uplink communications received from RRU 130 have the CP removed by RRU 130 prior to the uplink communications being received at BBU 110.

Such a BBU 110 may operate with CP processing circuitry comprising CP add 126 circuitry that adds a CP to a downlink communication. Such a BBU 110 may additionally operate in additional examples of such a method with of inverse Fast Fourier transform (IFFT) 124 circuitry processing an orthogonal frequency-division multiplexing (OFDM) symbols into a modulated signal using an inverse fast Fourier transform (IFFT) 124 modulator, prior to adding the CP 126 and after receiving the signal at the BBU 110 from a network via backhaul transport 112. In an asymmetric system, this BBU 110 may not use a modulator or other FFT circuitry to perform a FFT process on an uplink communication, and this FFT uplink process may instead be performed at an RRU such as RRU 130.

Another operation of the method can include generating a frame and slot signal using a frame and slot signal generation 122 module, prior to IFFT 124 processing and after receiving the signal. The operations of multiple-input multiple-output (MIMO) processing 118 circuitry for separating a channel data stream into a plurality of MIMO data streams for multiple antenna ports using a MIMO processor, and controlling a transmit power of each physical channel 120 module using a transmit power controller can also be included. Another operation of the method can include encoding binary input data for a channel using one or more modules for a channel encoder, interleaving coded data using a channel interleaver, and modulating interleaved data shown as channel coding, interleaving, and modulation 116. In certain embodiments, this places a downlink communication into a channel data stream using a channel modulator, prior to MIMO processing 118.

While the methods and block diagrams above illustrate various operations performed by device circuitry, including circuitry of BBU 110 and RRU 130, physical layer operations or circuit elements may be positioned and perform operations between the major elements described above.

Figure 4:
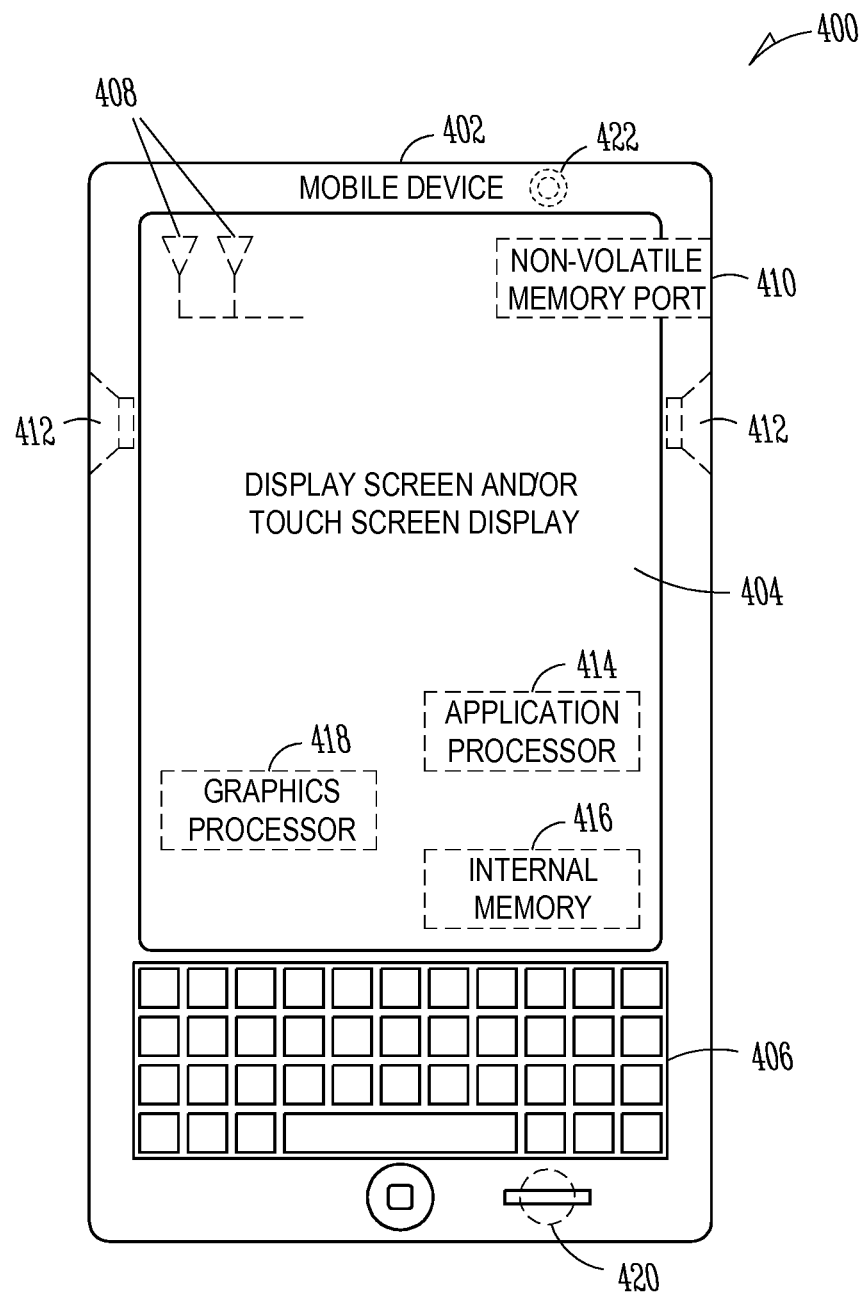
FIG. 4 illustrates an example UE which may be used with an asymmetric RAN, in accordance with some embodiments.

In various embodiments, a C-RAN such as C-RAN 200 which may use asymmetrical systems with a BBU 110 and RRU 130, the C-RAN may enable wireless communication with a variety of UE which may be mobile devices such as laptop computers, cellular telephones, tablet computers, and other such computers. FIG. 4 provides an example illustration of a UE 400. The UE can include one or more antennas configured to communicate with transmission station, such as a base station (BS), an evolved Node B (eNB), a RRU, or other type of wireless wide area network (WWAN) access point. The mobile device can be configured to communicate using at least one wireless communication standard including 3GPP LTE. WiMAX, High Speed Packet Access (HSPA), Bluetooth, and WiFi. The mobile device can communicate using separate antennas for each wireless communication standard or shared antennas for multiple wireless communication standards. The mobile device can communicate in a wireless local area network (WLAN), a wireless personal area network (WPAN), and/or a WWAN.

FIG. 4 illustrates an example of a UE 400. The UE 400 can be any mobile device, a mobile station (MS), a mobile wireless device, a mobile communication device, a tablet, a handset, or other type of mobile wireless computing device. The UE 400 can include one or more antennas 408 within housing 402 that are configured to communicate with a hotspot, base station (BS), an eNB, or other type of WLAN or WWAN access point. UE may thus communicate with a WAN such as the Internet via an eNB or base station transceiver implemented as part of an asymmetric RAN as detailed above. UE 400 can be configured to communicate using multiple wireless communication standards, including standards selected from 3GPP LTE, WiMAX, High Speed Packet Access (HSPA), Bluetooth, and Wi-Fi standard definitions. The UE 400 can communicate using separate antennas for each wireless communication standard or shared antennas for multiple wireless communication standards. The UE 400 can communicate in a WLAN, a WPAN, and/or a WWAN.

FIG. 4 also shows a microphone 420 and one or more speakers 412 that can be used for audio input and output from the UE 400. A display screen 404 can be a liquid crystal display (LCD) screen, or other type of display screen such as an organic light emitting diode (OLED) display. The display screen 404 can be configured as a touch screen. The touch screen can use capacitive, resistive, or another type of touch screen technology. An application processor 414 and a graphics processor 418 can be coupled to internal memory 416 to provide processing and display capabilities. A non-volatile memory port 410 can also be used to provide data input/output options to a user. The non-volatile memory port 410 can also be used to expand the memory capabilities of the UE 400. A keyboard 406 can be integrated with the UE 400 or wirelessly connected to the UE 400 to provide additional user input. A virtual keyboard can also be provided using the touch screen. A camera 422 located on the front (display screen) side or the rear side of the UE 400 can also be integrated into the housing 402 of the UE 400. Any such elements may be used to generate information that may be communicated as uplink data via an asymmetric C-RAN and to receive information that may be communicated as downlink data via an asymmetric C-RAN as described herein.

Figure 5:
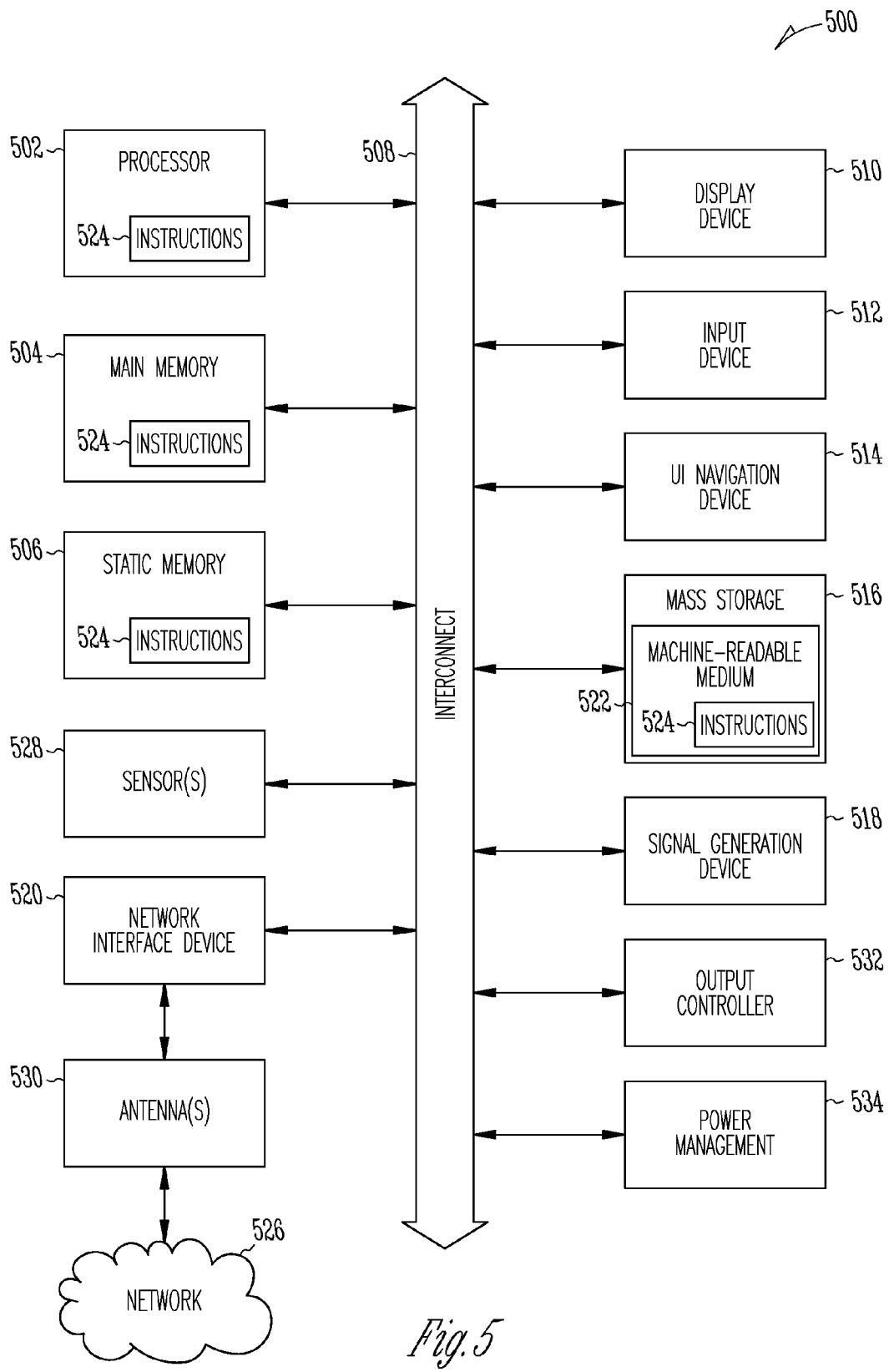
FIG. 5 is a block diagram illustrating an example computer system machine upon which any one or more of the methodologies herein discussed can be run, in accordance with some embodiments.

FIG. 5 is a block diagram illustrating an example computer system machine 500 upon which any one or more of the methodologies herein discussed can be run. Computer system machine 500 can be embodied as the a UE 400, a BBU 110, an RRU 130, or any other computing platform or element described or referred to herein. Additionally, aspects of computer machine 500 may be integrated with any BBU, RRU, or elements of a BBU or RRU such as BBU 110 and RRU 130. In various alternative embodiments, the machine operates as a standalone device or can be connected (e.g., networked) to other machines. In a networked deployment, the machine can operate in the capacity of either a server or a client machine in server-client network environments, or it can act as a peer machine in peer-to-peer (or distributed) network environments. The machine can be a personal computer (PC) that may or may not be portable (e.g., a notebook or a netbook), a tablet, a set-top box (STB), a gaming console, a Personal Digital Assistant (PDA), a mobile telephone or smartphone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system machine 500 includes a processor 502 (e.g., a central processing unit (CPU), a graphics processing unit (GPU) or both), a main memory 504 and a static memory 506, which communicate with each other via an interconnect 508 (e.g., a link, a bus, etc.). The computer system machine 500 can further include a video display unit 510, an alphanumeric input device 512 (e.g., a keyboard), and a user interface (UI) navigation device 514 (e.g., a mouse). In one embodiment, the video display unit 510, input device 512 and UI navigation device 514 are a touch screen display. The computer system machine 500 can additionally include a storage device 516 (e.g., a drive unit), a signal generation device 518 (e.g., a speaker), an output controller 532, a power management controller 534, and a network interface device 520 (which can include or operably communicate with one or more antennas 530, transceivers, or other wireless communications hardware), and one or more sensors 528, such as a Global Positioning Sensor (GPS) sensor, compass, location sensor, accelerometer, or other sensor.

The storage device 516 includes a machine-readable medium 522 on which is stored one or more sets of data structures and instructions 524 (e.g., software) embodying or utilized by any one or more of the methodologies or functions described herein. The instructions 524 can also reside, completely or at least partially, within the main memory 504, static memory 506, and/or within the processor 502 during execution thereof by the computer system machine 500, with the main memory 504, static memory 506, and the processor 502 also constituting machine-readable media.

While the machine-readable medium 522 is illustrated in an example embodiment to be a single medium, the term "machine-readable medium" can include a single medium or multiple media (e.g., a centralized or distributed database, and/or associated caches and servers) that store the one or more instructions 524. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions.

The instructions 524 can further be transmitted or received over a communications network 526 using a transmission medium via the network interface device 520 utilizing any one of a number of well-known transfer protocols (e.g., HTTP). The term "transmission medium" shall be taken to include any intangible medium that is capable of storing, encoding, or carrying instructions for execution by the machine, and includes digital or analog communications signals or other intangible medium to facilitate communication of such software.

Various techniques, or certain aspects or portions thereof may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, or other medium for storing electronic data. The base station and mobile station may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

Although the preceding examples of wireless network connections were provided with specific reference to 3GPP LTE/LTE-A, IEEE 802.11, and Bluetooth communication standards, it will be understood that a variety of other WWAN, WLAN, and WPAN protocols and standards can be used in connection with the techniques described herein. These standards include, but are not limited to, other standards from 3GPP (e.g., HSPA+, UMTS), IEEE 802.16 (e.g., 802.16p), or Bluetooth (e.g., Bluetooth 4.0, or like standards defined by the Bluetooth Special Interest Group) standards families. Other applicable network configurations can be included within the scope of the presently described communication networks. It will be understood that communications on such communication networks can be facilitated using any number of personal area networks, LANs, and WANs, using any combination of wired or wireless transmission mediums.

The embodiments described above can be implemented in one or a combination of hardware, firmware, and software. Various methods or techniques, or certain aspects or portions thereof, can take the form of program code (i.e., instructions) embodied in tangible media, such as flash memory, hard drives, portable storage devices, read-only memory (ROM), random-access memory (RAM), semiconductor memory devices (e.g., Electrically Programmable Read-Only Memory (EPROM), Electrically Erasable Programmable Read-Only Memory (EEPROM)), magnetic disk storage media, optical storage media, and any other machine-readable storage medium or storage device wherein, when the program code is loaded into and executed by a machine, such as a computer or networking device, the machine becomes an apparatus for practicing the various techniques.

A machine-readable storage medium or other storage device can include any non-transitory mechanism for storing information in a form readable by a machine (e.g., a computer). In the case of program code executing on programmable computers, the computing device can include a processor, a storage medium readable by the processor (including volatile and non-volatile memory and/or storage elements), at least one input device, and at least one output device. One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations.

It should be understood that the functional units or capabilities described in this specification can have been referred to or labeled as components or modules, in order to more particularly emphasize their implementation independence. For example, a component or module can be implemented as a hardware circuit comprising custom very-large-scale integration (VLSI) circuits or gate arrays, off-the-shelf semiconductors such as logic chips, transistors, or other discrete components. A component or module can also be implemented in programmable hardware devices such as field programmable gate arrays, programmable array logic, programmable logic devices, or the like. Components or modules can also be implemented in software for execution by various types of processors. An identified component or module of executable code can, for instance, comprise one or more physical or logical blocks of computer instructions, which can, for instance, be organized as an object, procedure, or function. Nevertheless, the executables of an identified component or module need not be physically located together, but can comprise disparate instructions stored in different locations which, when joined logically together, comprise the component or module and achieve the stated purpose for the component or module.

Indeed, a component or module of executable code can be a single instruction, or many instructions, and can even be distributed over several different code segments, among different programs, and across several memory devices. Similarly, operational data can be identified and illustrated herein within components or modules, and can be embodied in any suitable form and organized within any suitable type of data structure. The operational data can be collected as a single data set, or can be distributed over different locations including over different storage devices, and can exist, at least partially, merely as electronic signals on a system or network. The components or modules can be passive or active, including agents operable to perform desired functions.

Additional examples of the presently described method, system, and device embodiments include the following, non-limiting configurations. Each of the following non-limiting examples can stand on its own, or can be combined in any permutation or combination with any one or more of the other examples provided below or throughout the present disclosure.

What is claimed is:

1. A remote radio unit (RRU) for asymmetric uplink and downlink operation comprising hardware processing circuitry configured to:
   receive an uplink communication via an air interface from a user equipment (UE);
   convert the uplink communication from an uplink time domain signal to an uplink frequency domain signal;
   communicate the uplink frequency domain signal to a baseband unit (BBU) via a physical communication link;
   receive a downlink communication from the BBU via the physical communication link, the downlink communication comprising a downlink time domain signal such that the RRU operates asymmetrically with fast Fourier transform (FFT/IFFT) processing being separately performed by the RRU for the uplink communications and by the BBU for downlink communications;
   circuitry configured to remove an uplink cyclic prefix (CP) from the uplink communication; and
   uplink radio frequency (RF) filtering circuitry and downlink RF filtering circuitry, wherein the RRU is further configured such that the communication with the UE via the air interface comprises a frequency division duplex communication;
   wherein conversion of the uplink communication from the uplink time domain signal to the uplink frequency domain signal is performed by fast Fourier transform on the uplink communication; and
   wherein the downlink communication as received from the BBU includes a downlink CP.

2. The RRU of claim 1 wherein the RRU is further configured such that the downlink communication is not part of a downlink joint transmission.

3. The RRU of claim 1 wherein the RRU is further configured with a system bandwidth of between 9-11 MHz, a downlink rate from the BBU of between 90 Mbps and 110 Mbps, a frequency domain I/Q sampling rate of 16 bits, and an uplink rate to the BBU of between 600 Mbps and 800 Mbps.

4. The RRU of claim 1 further comprising a random access channel (RACH) processing circuitry for uplink channel processing.

5. The RRU of claim 1 further comprising modulating circuitry, wherein the modulating circuitry comprises FFT circuitry to perform the FFT on the uplink communication and wherein the modulating circuitry is not configured to perform an inverse fast Fourier transform on the downlink communication.

6. The RRU of claim 1 further comprising an optical input and output, wherein the physical communication link comprises an optical transport network.

7. The RRU of claim 1 wherein the RRU is configured as a first RRU of a plurality of RRUs in cloud radio access network.

8. The RRU of claim 1 wherein the RRU is configured to communicate with the BBU as part of a baseband processing pool via a load balancer and switch.

9. The RRU of claim 1 wherein the downlink CP of the downlink communication is added to the downlink communication by the BBU, wherein the downlink communication is processed and output as the downlink time domain signal by inverse FFT circuitry of the BBU, and wherein the RRU is not configured to add the downlink CP to the downlink communication.

10. The RRU of claim 1 further comprising a plurality of transmit antennas and a plurality of receive antennas, wherein the RRU is further configured such that the uplink communication is part of an uplink joint transmission.

11. A non-transitory computer readable medium comprising instructions for asymmetric uplink and downlink operation that, when executed by a remote radio unit (RRU), cause the RRU to: receive an uplink frame via an air interface from a user equipment (UE); convert the uplink frame from an uplink time domain signal to an uplink frequency domain signal; communicate the uplink frequency domain signal to a baseband unit (BBU) via a physical communication link; and receive a downlink frame from the BBU via the physical communication link, the downlink frame comprising a downlink time domain signal such that the RRU operates asymmetrically with fast Fourier transform (FFT/IFFT) processing being separately performed by the RRU for the uplink frames and by the BBU for the downlink frames; receive the uplink frame at the RRU from a first user equipment (UE); process the uplink frame at the RRU to remove an uplink cyclic prefix (CP) using CP remover circuitry of the RRU; perform a fast Fourier transform using a modulator on the uplink frame without the uplink CP to generate the uplink frequency domain signal; wherein communication of the uplink frame to the BBU via the physical communication link follows the fast Fourier Transform; wherein reception of the downlink frame at the RRU from the BBU via the physical communication link occurs with the downlink frame comprising a downlink CP as added to the downlink frame by CP add circuitry of the BBU, and wherein the downlink frame comprises a time domain signal as processed by inverse fast Fourier transform circuitry of the BBU.

12. The non-transitory computer readable medium of claim 11 wherein the instructions further cause the RRU to communicate the downlink frame to the UE without processing the downlink frame at the RRU to adjust the downlink CP of the downlink frame and without processing the downlink frame with the modulator.

13. The non-transitory computer readable medium of claim 11 wherein the instructions configure the RRU with a system bandwidth of between 9-11 MHz, a downlink rate from the BBU of between 90 Mbps and 110 Mbps, a frequency domain I/Q sampling rate of 16 bits, and an uplink rate to the BBU of between 600 Mbps and 800 Mbps.

14. The non-transitory computer readable medium of claim 11 wherein the instructions further configure the RRU to communicate with the BBU as part of a baseband processing pool via a load balancer and switch.

15. The non-transitory computer readable medium of claim 11 wherein the instructions configure the uplink frame as part of an uplink joint transmission.

16. A method for asymmetric uplink and downlink operation performed executed by a remote radio unit (RRU), the method comprising:
   processing an uplink frame via an air interface from a user equipment (UE); converting the uplink frame from an uplink time domain signal to an uplink frequency domain signal; processing the uplink frequency domain signal for communication to a baseband unit (BBU) via a physical communication link; and processing a downlink frame from the BBU via the physical communication link, the downlink frame comprising a downlink time domain signal such that the RRU operates asymmetrically with fast Fourier transform (FFT/IFFT) processing being separately performed by the RRU for the uplink frames and by the BBU for the downlink frames; receiving the uplink frame at the RRU from a first user equipment (UE); processing the uplink frame at the RRU to remove an uplink cyclic prefix (CP) CP using CP remover circuitry of the RRU; performing the fast Fourier transform using a modulator on the uplink frame without the uplink CP to generate the uplink frequency domain signal; wherein communication of the uplink frame to the BBU via the physical communication link follows the fast Fourier Transform; wherein reception of the downlink frame at the RRU from the BBU via the physical communication link occurs with the downlink frame comprising a downlink CP as added to the downlink frame by CP add circuitry of the BBU, and wherein the downlink frame comprises a time domain signal as processed by inverse fast Fourier transform circuitry of the BBU.

17. The method of claim 16 further comprising communicating the downlink frame to the UE without processing the downlink frame at the RRU to adjust the downlink CP of the downlink frame and without processing the downlink frame with the modulator.

18. The method of claim 16 wherein the RRU further operates asymmetrically with cyclic prefix (CP) processing being separately performed by the RRU for the uplink frames and by the BBU for downlink frames.

* * * * *

UNITED STATES PATENT AND TRADEMARK OFFICE
CERTIFICATE OF CORRECTION

PATENT NO. : 10,231,232 B2
APPLICATION NO. : 14/578045
DATED : March 12, 2019
INVENTOR(S) : Niu et al.

It is certified that error appears in the above-identified patent and that said Letters Patent is hereby corrected as shown below:

In the Claims

In Column 16, Line 11, in Claim 11, after "to:", insert --¶--

In Column 16, Line 12, in Claim 11, after "(UE);", insert --¶--

In Column 16, Line 14, in Claim 11, after "signal;", insert --¶--

In Column 16, Line 16, in Claim 11, after "and", insert --¶--

In Column 16, Line 22, in Claim 11, after "frames;", insert --¶--

In Column 16, Line 23, in Claim 11, after "(UE);", insert --¶--

In Column 16, Line 25, in Claim 11, after "RRU;", insert --¶--

In Column 16, Line 28, in Claim 11, after "signal;", insert --¶--

In Column 16, Line 30, in Claim 11, after "Transform;", insert --¶--

In Column 16, Line 60, in Claim 16, after "(UE);", insert --¶--

In Column 16, Line 62, in Claim 16, after "signal;", insert --¶--

In Column 16, Line 64, in Claim 16, after "and", insert --¶--

In Column 17, Line 3, in Claim 16, after "frames;", insert --¶--

In Column 17, Line 5, in Claim 16, after "(UE);", insert --¶--

Signed and Sealed this
Nineteenth Day of December, 2023

*Katherine Kelly Vidal*
Katherine Kelly Vidal
*Director of the United States Patent and Trademark Office*

CERTIFICATE OF CORRECTION (continued)
U.S. Pat. No. 10,231,232 B2

In Column 17, Line 6, in Claim 16, before "using", delete "CP"

In Column 17, Line 7, in Claim 16, after "RRU;", insert --¶--

In Column 17, Line 10, in Claim 16, after "signal;", insert --¶--

In Column 17, Line 12, in Claim 16, after "Transform;", insert --¶--